(12) United States Patent
Bourke

(10) Patent No.: US 8,220,453 B2
(45) Date of Patent: Jul. 17, 2012

(54) PROTECTION SYSTEM FOR A SOLAR WATER HEATING SYSTEM

(75) Inventor: Brendan Vincent Bourke, Gordon (AU)

(73) Assignee: Rheem Australia Pty Limited, Rydalmere, NSW (AU)

( * ) Notice: Subject to any disclaimer, the term of this patent is extended or adjusted under 35 U.S.C. 154(b) by 289 days.

(21) Appl. No.: 11/231,056

(22) Filed: Sep. 20, 2005

(65) Prior Publication Data
US 2006/0107944 A1 May 25, 2006
US 2007/0240703 A9 Oct. 18, 2007

Related U.S. Application Data

(63) Continuation of application No. PCT/AU2004/000459, filed on Apr. 8, 2004.

(30) Foreign Application Priority Data

Apr. 11, 2003 (AU) ............................. 2003901720
Nov. 13, 2003 (AU) ............................. 2003906266
Feb. 17, 2004 (AU) ............................. 2004900789

(51) Int. Cl.
*F24J 2/40* (2006.01)
*F24J 2/44* (2006.01)
(52) U.S. Cl. ........ 126/638; 126/599; 126/714; 126/643; 126/589
(58) Field of Classification Search .................. 126/638, 126/639, 641, 642, 583, 585, 589, 634, 636, 126/643, 645, 714
See application file for complete search history.

(56) References Cited

U.S. PATENT DOCUMENTS 246,626 A 9/1881 Morse
(Continued)

FOREIGN PATENT DOCUMENTS

EP 0 546 481 6/1993
(Continued)

OTHER PUBLICATIONS

International Search Report in PCT Application No. PCT/AU2004/000459.

(Continued)

*Primary Examiner* — Steven B McAllister
*Assistant Examiner* — Desmond Peyton
(74) *Attorney, Agent, or Firm* — Whitham, Curtis, Christofferson & Cook, P.C.

(57) ABSTRACT

The present invention includes a solar water heating system including: a water tank to hold water to be heated, an heat transfer fluid circuit including an heat exchanger associated with said water tank to heat water therein, a solar collection means in communication with said heat exchanger, an inlet connection to carry heat transfer fluid from said solar collection means to said heat exchanger where said water will be heated; and an outlet connection to carry heat transfer fluid from said heat exchanger to said solar collection means where said heat transfer fluid will be heated, said heat transfer fluid circuit including a reversibly evaporable heat transfer fluid which will absorb heat from said solar collection means and which will transfer said heat to said water in said water tank by means of said heat exchanger; and an diversion path being provided in said heat transfer circuit, whereby when a portion of heat transfer fluid changes to a gaseous state in said solar collection means, heat transfer fluid in a liquid state will be forced out of said solar collection means under pressure into said diversion path.

35 Claims, 16 Drawing Sheets

U.S. PATENT DOCUMENTS

| | | | | |
|---|---|---|---|---|
| 1,971,242 A | * | 8/1934 | Wheeler | 126/596 |
| 3,390,672 A | * | 7/1968 | Snelling | 126/636 |
| 4,061,131 A | * | 12/1977 | Bohanon | 126/590 |
| 4,120,289 A | * | 10/1978 | Bottum | 126/586 |
| 4,150,659 A | | 4/1979 | Buckley | |
| 4,186,033 A | * | 1/1980 | Boling et al. | 136/247 |
| 4,217,885 A | | 8/1980 | Bowles | |
| 4,219,009 A | | 8/1980 | Palmer | |
| 4,226,225 A | | 10/1980 | Niedermeyer | |
| 4,237,865 A | | 12/1980 | Lorenz | |
| 4,240,405 A | * | 12/1980 | French | 126/637 |
| 4,270,517 A | | 6/1981 | Stephens | |
| 4,281,639 A | * | 8/1981 | Kuronen | 126/629 |
| 4,341,202 A | * | 7/1982 | French | 126/584 |
| 4,421,100 A | * | 12/1983 | Yu | 126/618 |
| 4,422,443 A | | 12/1983 | Arendt | |
| 4,469,087 A | | 9/1984 | Cameron | |
| 5,404,867 A | | 4/1995 | Rich | |
| 5,660,165 A | * | 8/1997 | Lannes | 126/641 |

FOREIGN PATENT DOCUMENTS

JP   2002-031416   1/2002

OTHER PUBLICATIONS

International Preliminary Report on Patentability—PCT/AU2004/000459.

\* cited by examiner

PROTECTION SYSTEM FOR A SOLAR WATER HEATING SYSTEM

CROSS-REFERENCE TO RELATED APPLICATIONS

This application is a continuation of and claims the filing date benefit of International Application No. PCT/AU2004/000459 filed Apr. 8, 2004, which claims priority to Australian Patent Application 2003901720 filed Apr. 11, 2003; Australian Patent Application 2003906266 filed Nov. 13, 2003; and Australian Patent Application 2004900789 filed Feb. 17, 2004. The entire disclosures of these prior applications are incorporated herein by this reference.

FIELD OF THE INVENTION

The present invention relates to solar water heaters and in particular to solar water systems which include over-heating protection systems.

BACKGROUND OF THE INVENTION

As standards for plumbing products are made more stringent, there is a need to provide protection for plumbing products in a solar water heater environment, particularly once water in a tank heated by solar means has reached its desired temperature. Unlike electrical or gas hot water systems which have their elements or gas burners turned off when the desired temperature is reached, a solar collector associated with a solar water heater will continue to gather solar energy.

In continuing to gather solar energy the solar heating system and its associated plumbing could be compromised by over heating.

The applicant does not concede that the prior art discussed in the specification forms part of the common general knowledge in the art at the priority date of this application.

SUMMARY OF THE INVENTION

The present invention provides a solar water heating system including: a water tank to hold water to be heated, an heat transfer fluid circuit including an heat exchanger associated with said water tank to heat water therein, a solar collection means in communication with said heat exchanger, an inlet connection to carry heat transfer fluid from said solar collection means to said heat exchanger where said water will be heated; and an outlet connection to carry heat transfer fluid from said heat exchanger to said solar collection means where said heat transfer fluid will be heated, said heat transfer fluid circuit including a reversibly evaporable heat transfer fluid which will absorb heat from said solar collection means and which will transfer said heat to said water in said water tank by means of said heat exchanger; and a diversion path being provided in said heat transfer circuit, whereby when a portion of heat transfer fluid changes to a gaseous state in said solar collection means, heat transfer fluid in a liquid state will be forced out of said solar collection means under pressure into said diversion path.

The inlet connection can exit said solar collection means at a first location which is above a second location where said outlet connection enters said solar collection means, said system being characterised by including a flow stop means to stop the flow of said heat transfer fluid in response to a signal indicative of the heat transfer fluid circuit having attained a predetermined over-temperature condition.

The inlet connection can include a valve means which can be closed.

The outlet connection can include a valve means which can be closed.

The heat transfer fluid in a liquid state can be forced out of said solar collection means under pressure passes via said second location and then into said expansion means.

The inlet connection can alternatively exit said solar collection means at a first location and said outlet connection entering said solar collection means at a second location, said first location and second location both being located at the lower end of the solar collection means, whereby said heat transfer fluid in a liquid state will be forced out of said solar collection means under pressure via said second location and or said first location and into said expansion means.

The direction of flow of said heat transfer fluid leaving said solar collection means to enter said expansion means can be in the opposite direction as for the normal heating operation of said system. Alternatively the direction of flow of said heat transfer fluid leaving said solar collection means to enter said expansion means can be in the same direction as for the normal heating operation of said system.

A valve means can be used to prevent gaseous heat transfer fluid being pushed out of said solar collectors.

The heat exchanger can be a jacket located around said water tank. Alternatively the heat exchanger can be located inside of said water tank.

The expansion means can be provided separate of said heat exchanger.

The water tank can include said expansion means, or said expansion means can be attached thereto or included therein.

The heat exchanger associated with said water tank to heat water therein, can be a brazed plate heat exchanger.

The solar collection means or said outlet connection can include, between said expansion means and said solar collection means, a liquid trap, to prevent gas passing therethrough.

The volume able to be received by said expansion means can be in the range of the volume of heat transfer fluid in said solar collection means up to the total volume of heat transfer fluid in the system. Alternatively the volume able to be received by said expansion means is in the range of the volume of heat transfer fluid in said solar collection means plus said inlet and said outlet connections up to the total volume of heat transfer fluid in said system.

The solar collection means can have collection flow tubes oriented in a substantially horizontal orientation.

The solar collection means can have collection flow tubes oriented in a substantially vertical orientation.

The solar collection means can have collection flow tubes oriented at an angle to the vertical or horizontal.

The heat transfer fluid circuit can have the heat transfer fluid circulate therein by means of thermosyphoning. Alternatively the heat transfer fluid circuit can have the heat transfer fluid circulate therein by a pump means.

The pump can be switched off when an over temperature or over pressure condition is detected in said system.

The pump can be located in said outlet connection between an outlet of said heat exchanger and the inlet to said solar collection means.

A valve can be included in said heat transfer circuit so that thermosyphoning in cool ambient conditions will not occur.

The heat transfer circuit can also have a one way valve in said circuit.

A valve to prevent said heat transfer fluid flowing in a direction opposite to said pumping direction can be located in said inlet connection between an outlet of said solar collection means and the inlet to said heat exchanger.

The solar collection means can be a flat plate collector.

The solar collection means can include two or more solar collection panels being connected in series with said inlet connection and said outlet connection.

The solar collection means can include two or more solar collection panels being connected in parallel with said inlet connection and said outlet connection.

The heat transfer fluid can ascend in a first panel and transfers to a second panel wherein it descends to exit said second panel.

The transfer fluid can ascends in a first half of each panel and transfers to a second half wherein it descends to exit the panel.

The heat transfer fluid can include a 1,2-propylene glycol, water and inhibitors.

The heat transfer fluid can be that known by the brand name TYOFOCOR LS manufactured by Tyforop Chemie GmbH, or its equivalent.

The valve means can be a non return valve and or a remotely controlled isolating valve.

The flow stop means and said valve means can be combined in a single isolation valve.

The flow stop means can switch off a pump circulating said heat transfer fluid in said circuit.

The expansion means can be branched off said outlet connection.

The expansion means can be branched off said inlet connection.

There can be two expansion means, a respective one branching of said inlet connection and said outlet connection.

The expansion means can be located between a pump and said inlet to said solar collection means.

The expansion means can be a reservoir or a vessel.

The expansion means can include a pressure relief valve associated therewith.

The pressure relief valve can be forced to operate by said heat transfer fluid acting indirectly thereon, such as by means of air being pressurised by said heat transfer fluid.

The expansion means can communicate with the heat transfer fluid circuit, whereby once pressure in said circuit reduces, any liquid heat transfer fluid which passed into said reservoir can pass back into said heat transfer fluid circuit.

A pressure relief valve can be present between said heat transfer fluid circuit and said expansion means, whereby heat transfer fluid passing to said expansion means does so via said pressure relief valve into said expansion means.

The expansion means can be vented to atmosphere.

Heat transfer fluid passing said pressure relief valve can exit a conduit from said pressure relief valve which terminates near to the bottom of said reservoir.

The reservoir can include an amount of liquid heat transfer fluid in the bottom thereof to a level which will cover the termination of said conduit.

The pressure relief valve can be of the type which has a one way valve to allow fluid passing out of said circuit to re-enter said circuit.

The solar water heating system can have the heat transfer fluid circulate in said circuit by means of a pump, while said water is heated by a thermosyphoning mechanism.

The present invention also provides a method of protecting a solar water heating system, said method including the step of:

allowing some of the heat transfer fluid in said system to boil in solar collectors in said system, whereby once boiled the heat transfer fluid in the gaseous state will force liquid heat transfer fluid from said collectors, accommodating the expanded volume of heat transfer fluid in an expansion means.

The valve means used in the method can be used to prevent gaseous heat transfer fluid being pushed out of said solar collectors via the outlet of said solar collectors, said outlet being that opening from which heated heat transfer fluid would normally exit said collectors to travel to a heat exchanger to heat water in a tank of said system.

The expansion means can be located between an outlet of the heat exchanger of said system and the inlet to the solar collectors, said inlet being that opening from which cooled heat transfer fluid would normally enter said collectors after heating water in a tank via a heat exchanger.

The present invention also provides a solar panel having a casing with box like construction with a clear or translucent top surface, a bottom surface, left, right, upper and lower side surfaces, said solar panel including a conduit or conduits to carry a heat transfer fluid therein and an inlet and outlet to said panel communicating with said conduit or conduits, said casing being characterised by at least one side surface including at least one aperture therein which is able to be sealed by a hatch means, said hatch means being able to be opened and closed in response to the temperature of heat transfer fluid or air temperature or the temperature of water being heated by said heat transfer fluid, and another side surface including at least one aperture therein. The at least one aperture can be closed by a hatch which can be moved to an open condition when said solar panel is in an over temperature condition There can also be present a fan which operates in response to the temperature of heat transfer fluid or air temperature or the temperature of water being heated by said heat transfer fluid or is activated by a pressure sensor switch which opens and closes in response to the pressure in the heat transfer circuit to the water tank.

The present invention also provides a solar panel having a casing with box like construction with a clear or translucent upper surface, a lower surface, left and right side surfaces, and upper and lower side surfaces, said solar panel including a conduit or conduits therein to carry a heat transfer fluid therein and an inlet and out to said panel communicating with said conduit or conduits, said casing being characterised by at least one side surface including a fan which is operable in response to the temperature of heat transfer fluid or air temperature or the temperature of water being heated by said heat transfer fluid.

There can also be present duct associated with said fan which provides a heat trap to prevent air passing out of said casing until such time as the fan begins to operate in response to the temperature of heat transfer fluid or air temperature or the temperature of water being heated by said heat transfer fluid. If desired the duct can have its outlet closed by a hatch means which opens or closes in response to one or more of the temperature of heat transfer fluid or air temperature or the temperature of water being heated by said heat transfer fluid.

BRIEF DESCRIPTION OF THE DRAWINGS

Embodiments of the present invention will now be described, by way of example only, with reference to the accompanying drawings, in which.

DETAILED DESCRIPTION OF THE EMBODIMENT OR EMBODIMENTS

Figure 1:
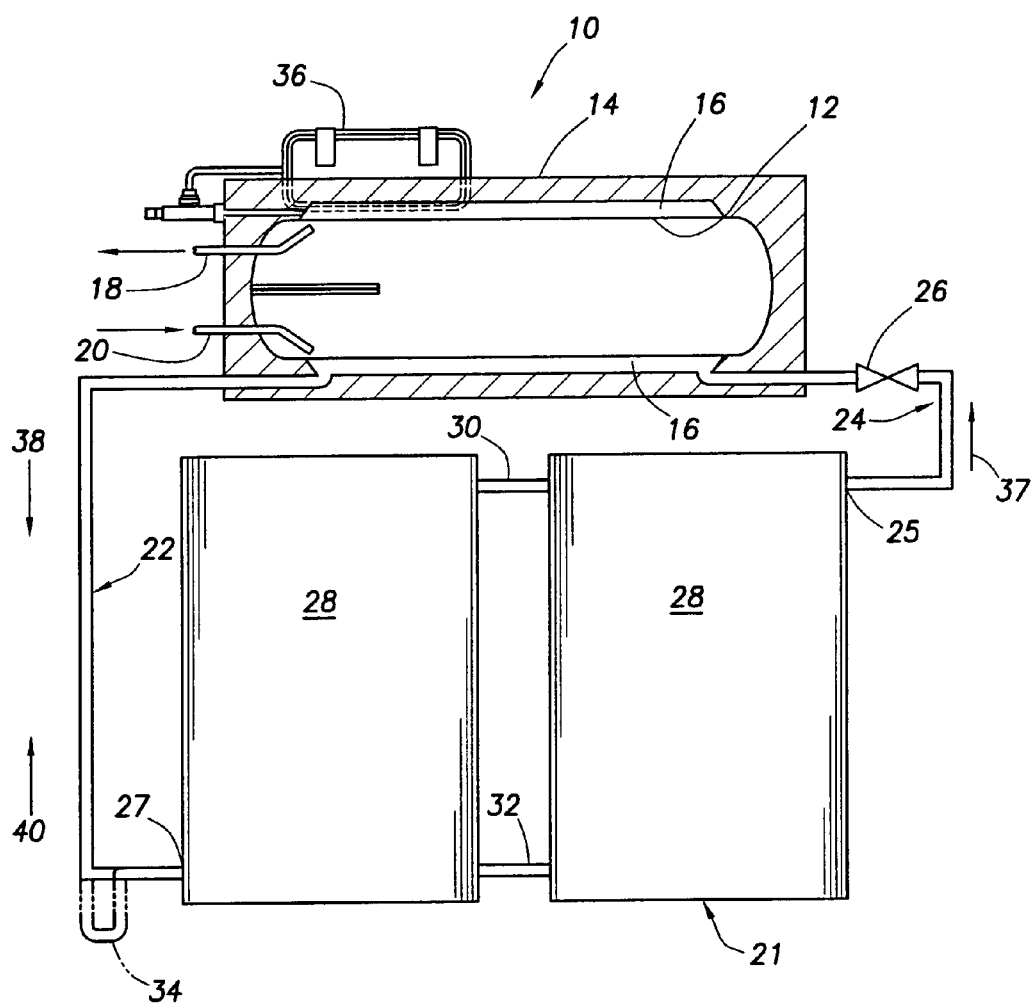
FIG. 1 is a schematic of a solar water heating system which has heat transfer fluid circulating by means of thermosyphoning, and has an heat exchanger in the form of a jacket which surrounds the water tank.

Illustrated in FIG. 1 is a solar water heating system 10 which has a water tank 12 contained within an insulated enclosure 14. The tank 12 can be of the order of 270 to 400 liters in volume. Between the exterior of the tank 12 and the insulation of the insulated enclosure 14 is an heat exchanger in the form of a jacket 16 which surrounds the water tank 12.

The water tank 12 has a hot water outlet 18 and a cold water inlet 20.

An heat transfer fluid circuit, generally designated with numeral 21, (which will contain and have flowing therein a heat transfer fluid), includes the jacket 16, an inlet connection 24 which provides fluid communication between the inlet to the jacket 16 and the outlet 25 of two connected solar collection panels 28, and an outlet connection 22 which provides fluid communication between the outlet from the jacket 16 and the inlet 27 to the solar collection panels 28.

The circuit 21 also has fluid connections 30 and 32 interconnecting the two solar collection panels which are of the flat plate type.

Figure 2:
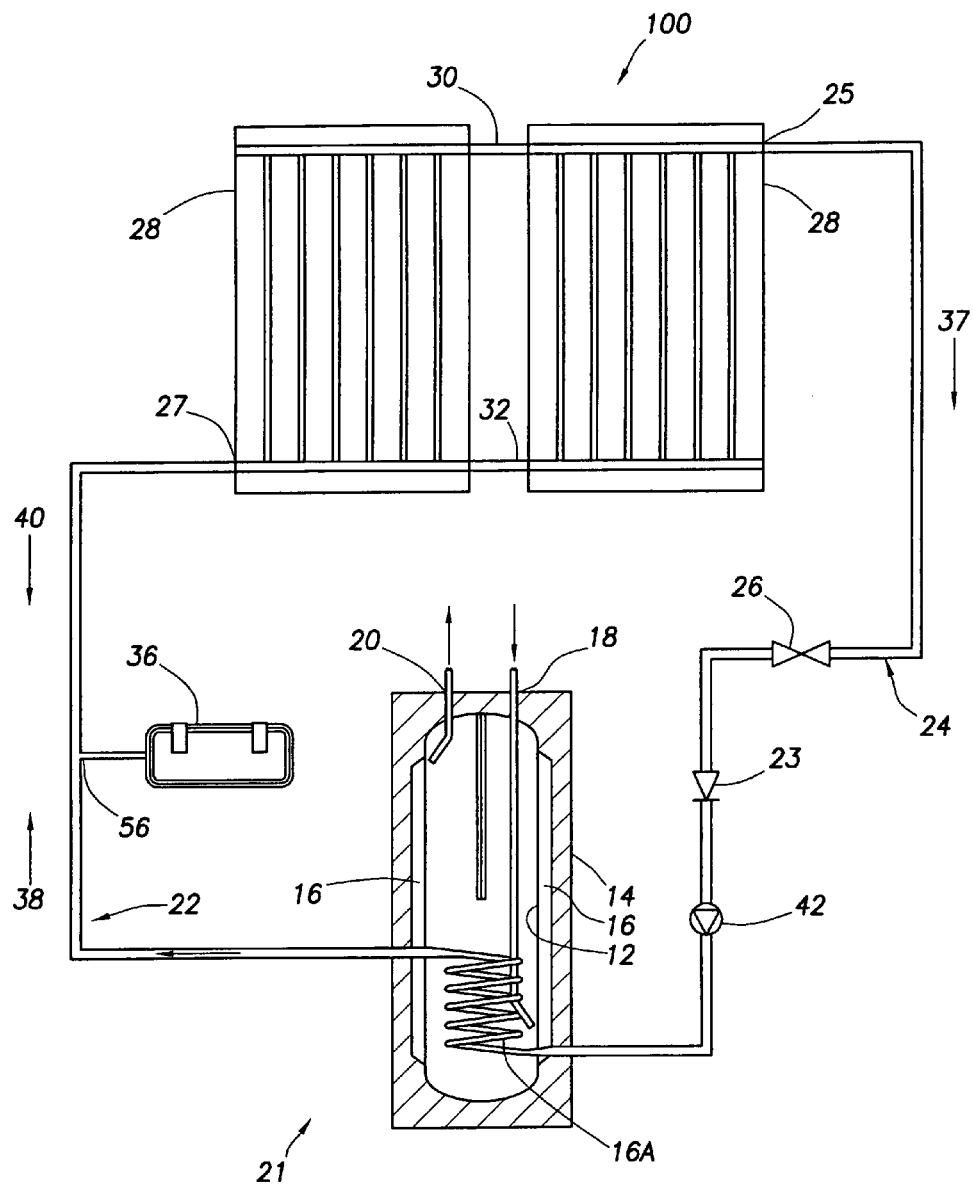
FIG. 2 is a schematic of a solar water heating system which has heat transfer fluid circulating by means of a pump, and has an heat exchanger immersed in the water tank.

FIGS. 1 & 2 show expansion vessels 36 connected to the heat transfer circuit. In FIG. 1, the expansion vessel 36 is connected to the heat transfer jacket 16. The circuit 21 and outlet connection 22 include a liquid trap 34 located near to the inlet 27 to the solar collection panels 28, with an optional liquid trap 34 (represented in phantom line work) being located below the solar panel 28. In FIG. 2, the outlet connection 22 includes an external stand alone expansion vessel 36.

Referring to FIG. 1, the circuit 21 and inlet connection 24 includes a controlled isolation valve 26 between the outlet 25 of the solar panels 28 and the inlet to the jacket 16. The isolation valve 26 can be electrically or electronically actuated by solenoid in response to one or more sensors in the system 100. Those sensors can measure one or more of the following: temperature of water being heated; temperature of heat transfer fluid; pressure in the heat transfer fluid; pressure in heat transfer fluid circuit; air temperature in solar collectors; surface temperature of solar collectors. At least one of these sensors is provided, such that as soon as any one reaches a predetermined temperature or pressure, a signal will be sent to actuate the valve 26 to thereby close it.

Once temperature or pressure decreases, the valve 26 will be re-opened. If pressure is sensed as the means to trip the valve 26 closed or open, then the trip pressure to close the valve 26 will be set to be the same pressure as that required to be achieved in the heat transfer fluid before the liquid heat transfer fluid will enter the expansion tank 36.

For cost and reliability reasons the most preferred valve is a thermostatically operated valve, such as those which have a bulb and capillary, allowing the temperature to be sensed from within the tank 12 or heat transfer circuit 21, to shut off the valve which is located outside of the tank enclosure. While a one way or non-return valve can be used, their lack of reliability can lead to increased costs and problems.

The heat transfer fluid is used to heat water contained in the water tank 12. The heat transfer fluid can be made up of water, glycol and inhibitors. The heat transfer fluid used is preferably of the reversibly evaporable type, whereby the inhibitors, the water and glycol will change to the gaseous state when sufficient heat is present, and then condense back to the liquid state once the heat is no longer present. Some inhibitors may crystallise as the water evaporates in the circuit 21. This is expected to be satisfactory providing that the crystals will dissolve back into the heat transfer fluid once liquid heat transfer fluid begins to occupy the space vacated by the vaporised heat transfer fluid.

The heat transfer fluid circulates through the heat transfer fluid circuit 21 in the direction of arrows 37 and 38, by means of differentials of density and temperature of the heat transfer fluid in the circuit which in turn causes the heat transfer fluid to circulate. This is known thermosyphoning and is commonly used by those skilled in the art.

The effect of closing the valve 26, once the desired water temperature has been reached, will stop the flow of the heat transfer fluid through the circuit 21 in the direction of arrows 37 and 38. For a relatively short period of time the heat transfer fluid will remain stagnant in the circuit 21 until such time as the solar panels 28 transfer enough heat to raise the temperature at which the equivalent saturation pressure is above the system pressure. At which point the heat transfer fluid in the panels 28 will boil from the liquid state to the gaseous state.

As the upper regions of the panels 28 will contain the heat transfer fluid at its hottest, the heat transfer fluid in this region will expand and change state. The gaseous state fluid will percolate to the top of the panels 28 forcing the cooler liquid heat transfer fluid to be pushed out of the panels 28, as the pressure builds up in the panels 28, and out of the panels 28 through inlet 27 and liquid trap 34 in the direction of arrow 40, which is in the opposite direction to arrow 38.

As the solar panels 28 will have heat transfer fluid in the gaseous state inside them, and as they are designed to transfer heat from solar energy to liquid, the efficiency or rate of heat transfer by the solar collector to gas will be decreased by comparison to transfer to a liquid heat transfer fluid.

Figure 3:
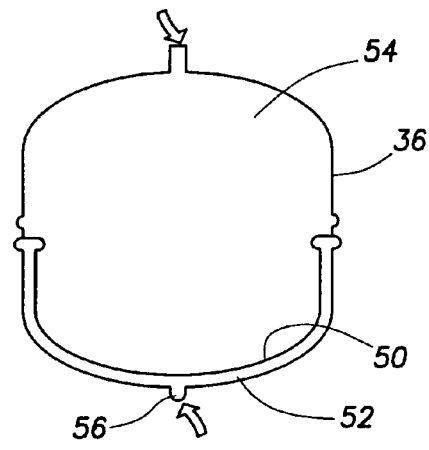
FIG. 3 is a schematic view of an empty expansion vessel that can be used the solar water heating systems of FIG. 1 or 2.
Figure 4:
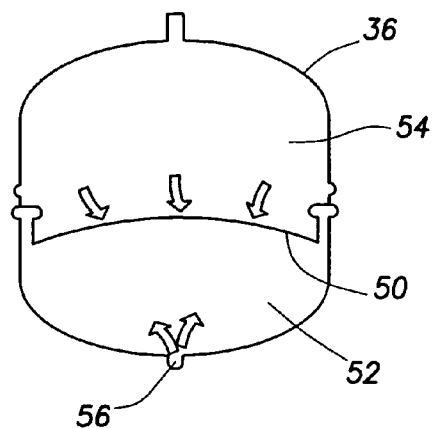
FIG. 4 is a schematic view of the expansion vessel of FIG. 3 partially filled.

The expansion vessel 36 as illustrated in FIGS. 3 and 4 includes a membrane 50 which separates a first side 52, from a second side 54. An inlet 56 is piped to or opens into the outlet connection 22, to allow the heat transfer fluid to gain entry to the first side 52. The second side 54 of the expansion vessel 36 can be sealed and under pressure from an inert gas such as nitrogen. A pressure in side 54 will help to keep the system readily operable. Alternatively the second side 54 can be simply open to atmosphere but it is expected that it will not operate as reliably.

The heat transfer fluid is prevented from entering the first side 52, until such time as a pressure is built up in the heat transfer circuit 21 which is greater than the pressure in side 54.

Thus as the pressure increases in the circuit between the inlet 27 and the valve 26 in the direction of arrow 40, above the pressure inside 54, then the liquid heat transfer fluid will enter the expansion vessel 36.

As the water in the water tank 12 cools, by drawing off of water and entry of cold supply water, the valve 26 will open, allowing the heat transfer fluid in the gaseous state to be cooled by the water allowing it to condense, contract in volume and decrease in pressure. The reduction in pressure will allow the gas pressure in side 54 of the expansion vessel 36 to push heat transfer fluid out of side 52. This allows the fluid in the expansion vessel 36 to flow back into the circuit 21, and the thermosyphoning effect can begin again.

Further, once the panels 12 cool, irrespective of whether the valve 26 is opened, the heat transfer fluid in the gaseous state will cool, contract in volume and reduce in pressure, and change back to the liquid state, with the same effect of forcing the fluid out of the expansion vessel 36 and of allowing the heat transfer fluid to be ready to circulate once the valve 26 is opened.

Where the expansion vessel 36 has its second side 54 at atmospheric pressure (whether this side is open to the atmosphere or not) the vessel 36 should be located above the inlet connection so that as the gaseous state cools, the liquid in the vessel 36 will drain or flow back into the circuit 21 under gravity.

Illustrated in FIG. 2 is another solar water heater system 100 which has like parts like numbered by comparison to those of FIG. 1.

The system 100 differs from that of FIG. 1 in that thermosyphoning is not utilised to circulate the heat transfer fluid in the circuit 21. This circulation is done by means of a pump 42. Another difference is that the heat exchanger 16A is located within the tank 12 and is fully immersed in the water in the water tank 12.

The system 100 also differs in that once the water in the tank 12 has reached its desired temperature, the pump 42 is switched off and a one way or non-return valve 23 prevents flow in a direction opposite to arrow 37. At this point the heat transfer fluid circuit 21 will function in the same manner as that described above with respect to FIG. 1. Sensors which detect temperature or pressure are used to switch off the pump 42 once conditions of temperature or pressure indicating an actual or potential over-temperature situation is sensed.

In the system 100, the non return valve 23 will close under influence of reverse flow, because the pump 42 will stop working and the liquid heat transfer fluid will attempt to flow backward in the inlet connection 24 under pressure of the gas formed in the solar panels 28.

If desired, a solenoid operated isolating valve 26 could be provided, either as an alternative to valve 23, or in combination therewith.

The preferred heat transfer fluid has the brand name TYOFOCOR LS manufactured by Tyforop Chemie GmbH, or its equivalent. This is a mixture of water, inhibitor and 1,2-propylene glycol. It will boil between 100° C. to 105° C. and will keep its corrosion inhibition performance and reversibly evaporable characteristics upto a stagnation temperature of around 320° C.

While this is the preferred heat transfer fluid, a heat transfer fluid having an inhibitor which crystallises when vaporisation or boil off occurs can also be utilised. However, it is preferable that the crystalline inhibitor redissolve in the liquid heat transfer fluid once contact between them is made.

Once the solar panels 28 have the heat transfer fluid in the gaseous state, as the efficiency of heat transfer will decrease, it is expected that the gaseous state will not attain a temperature any higher than 200° C. to 250° C. As such the characteristics and properties of the heat transfer fluid will not be compromised.

If desired the expansion vessel 36, in view of it being able to be of a comparatively smaller volume by comparison to prior art systems, can be provided as part of the jacket 16 and or within the insulated enclosure 14.

The pressure in the heat transfer fluid circuit 21 is maintained below that in the water tank 12, which is at mains water pressure. By so doing this, and with the use of the expansion vessel 36, the pressure will be maintained below, so that if corrosion or other failure of the jacket 16 of heat exchanger 16A were to occur, then, the heat transfer fluid will not seep into the potable water within the water tank 12. While heat transfer fluids of food grade quality could be utilised, it is preferred in order to meet a variety of standards that the risks of cross contamination are reduced.

The pressure in the side 54 of expansion vessel 36 needs to be of a magnitude to accommodate the expansion, within the vessel 36 without exceeding a pressure relief valve (not illustrated) which would normally be present in the heat transfer circuit 21.

In the embodiment of FIG. 2, an isolation valve (such as valve 26) can replace the non return valve 23, in which case the sensors and controls to switch off the pump 42 will also close the isolation valve at the same time, thus producing the same effect as described above. With the non return valve in the inlet connection 24, being located below the solar panels 28, gas will build up in the panels 28 and force liquid out as described above.

Figure 16:
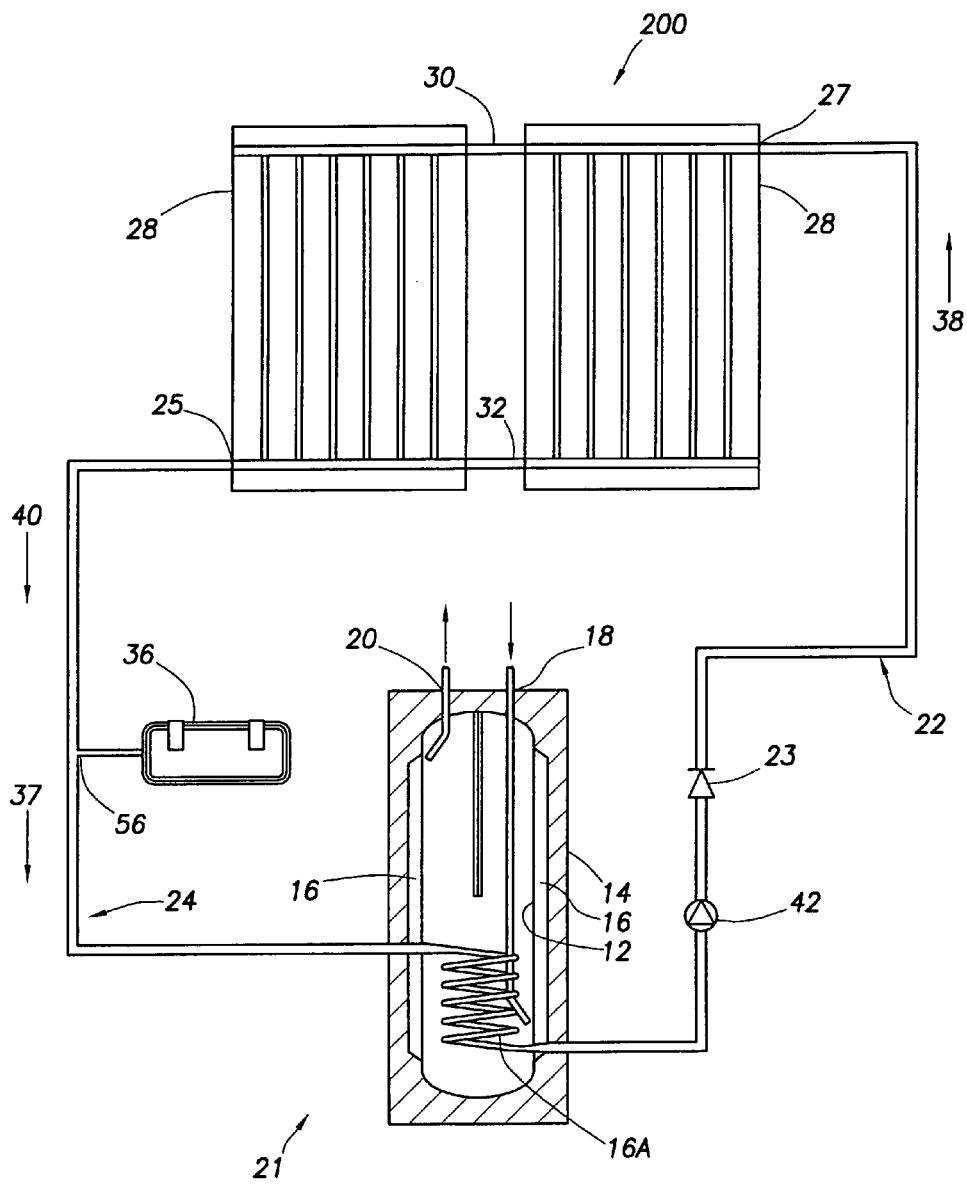
FIG. 16 illustrates the solar heating system of FIG. 2 with the heat transfer fluid circuit flowing in a reverse direction.

Illustrated in FIG. 16 is a system 200 which is similar to that of FIG. 2. In the system 200, the same components are utilised as in the system 100, and like parts have been like numbered. However, the flow direction of heat transfer fluid in the heat transfer circuit 21 is reversed. Accordingly the pump 42 and one way valve 23 are reversed; the outlet connection 22 and inlet connection 24 are on opposite sides of the heat exchanger associated with the water tank; the inlet 27 and outlet 25 to the solar panels 28 have swapped locations and the inlet 27 is above the outlet 25. The heat transfer fluid in the circuit 21, is such that in both collector panels 28, the heat transfer fluid flows from the top thereof to the bottom.

The system 200 can only work if a pump 42 is operational because the one way valve 23, will prevent a thermosyphoning flow which would ordinarily be in the direction opposite to arrow 38.

The system 200 will work in a similar manner to the system 100, except that once vaporisation of the heat transfer fluid occurs in the solar panel 28, the pump 42 is switched off. Fluid cannot move out of inlet 27 in a direction opposite to arrow 38, as the valve 23 stops this. Instead fluid will exit collectors 28 in direction of arrow 40 (being the same direction as the normal operation direction) and as pressure builds up in inlet connection 24, the pressurised liquid heat transfer fluid will flow into the expansion vessels 36.

Figure 5:
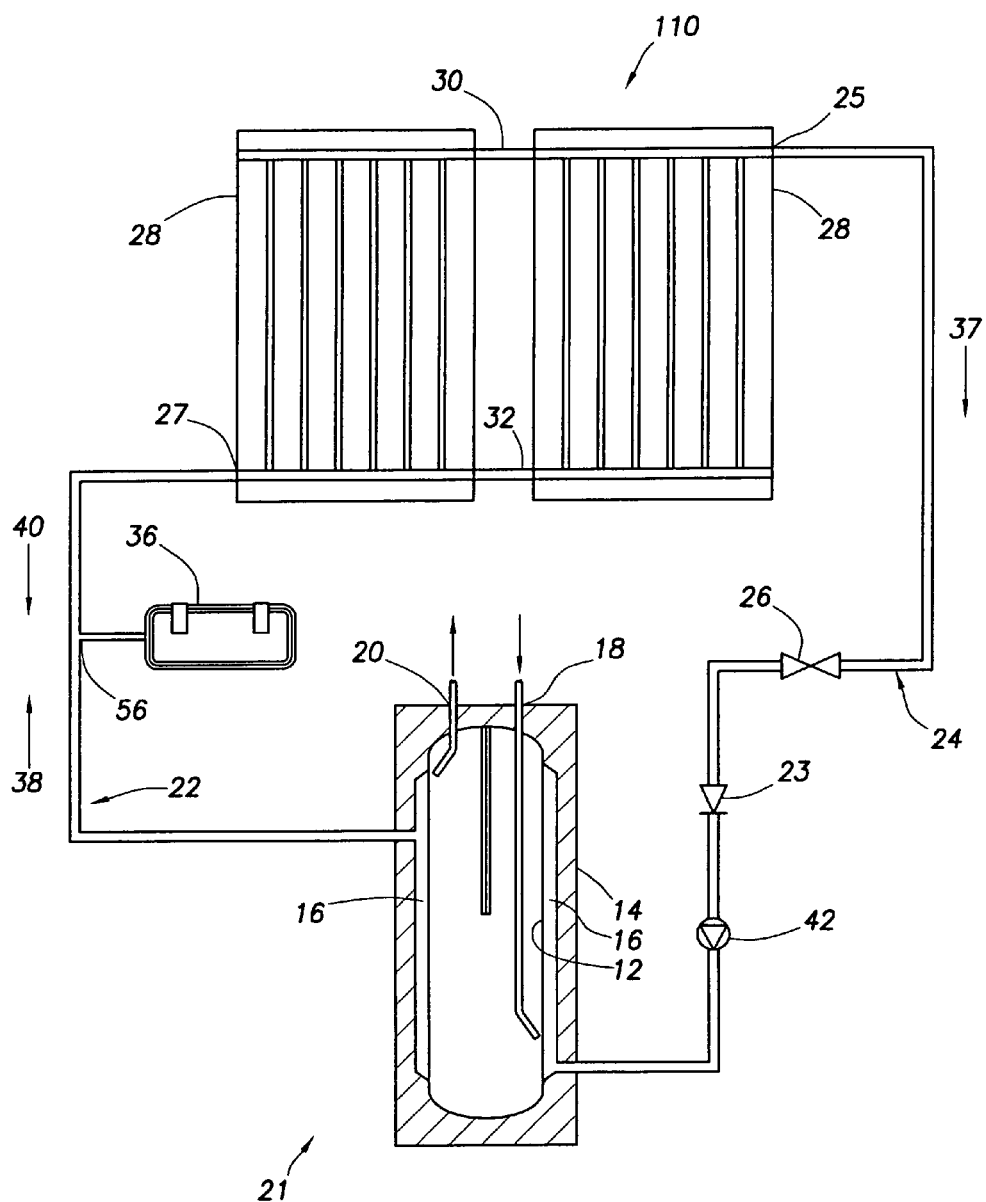
FIG. 5 illustrates a schematic of a solar water heating system similar to that of FIG. 2.

Illustrated in FIG. 5 is a solar heating system 110 which uses a pump to circulate the heat transfer fluid to heat water, i.e. it is a non thermosyphoning system to heat water. The system 110 is similar to the system 100 of FIG. 2, and like parts have been like numbered.

The differences between the system 100 and system 110 is that the system 110 has its tank 12 oriented in a vertical configuration and a water jacket 16 is provided in much the same manner as in the system 10 of FIG. 1. A further difference is that a non return valve 23 is provided in the inlet connection 24 between the outlet 25 of the solar collection panels 28 and the pump 42.

In the system 110 there is also present an electrically operated solenoid valve 26, which is controlled to open and close in response to the temperature of the water being heated, or the temperature of the heat transfer fluid in the heat transfer circuit.

Figure 6:
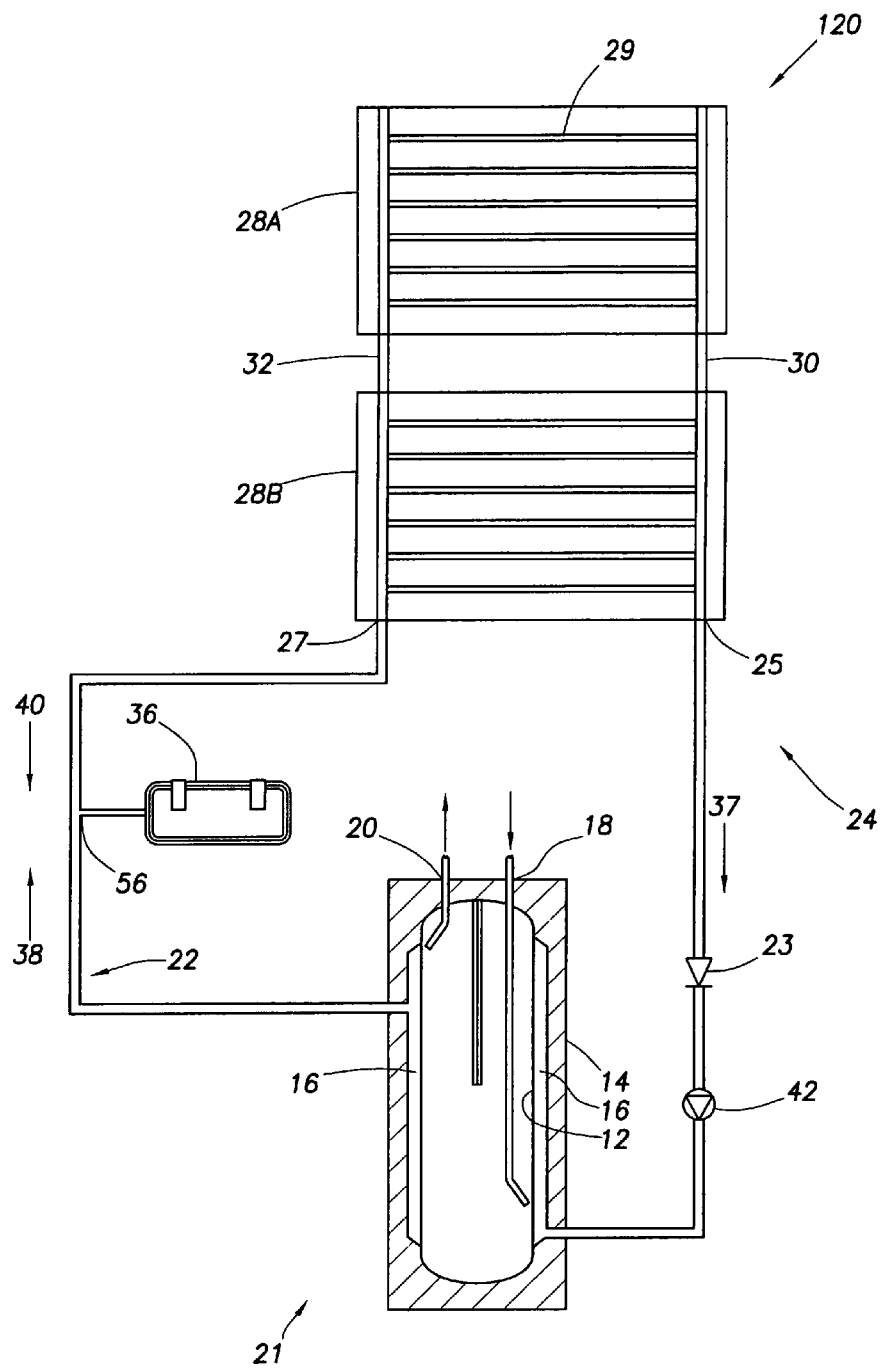
FIG. 6 illustrates a schematic of a solar water heating system similar to that of FIG. 5.

Illustrated in FIG. 6 is a system 120 similar to the system 110 of FIG. 5 and like parts have been like numbered. The differences between the system 120 and the system 110, include that the solar collection panels 28 are oriented so that the heat transfer fluid travels in the "risers" 29 in a horizontal direction. It will be noted from FIG. 6, that the inlet 27 to the solar collection panels 28 and outlet 25 from the solar collection panels 28 are located at the same level, at the bottom of the panel 28B, which is below the panel 28A.

In the configuration of FIG. 6, a non return valve 23 is provided which could be classified as optional, in that the non return valve 23 is not required to allow heat transfer fluid to enter into the expansion tank 36 if the heat transfer fluid in the panels 28 vaporises. The reason for this is that in view of the inlet 27 and outlet 25 being at the bottom of the lower panel 28B, any vaporisation of heat transfer fluid in the risers 29, will evacuate the effected riser, with vapour collecting in the upper reaches of the upper panel 28A. The vapour will gather in the panels 28 in a top down fashion, whereby the panel 28A will fill with vapour before the panel 28B fills with vapour.

This vapour collection mechanism will result in that portion of the heat transfer fluid in the panels 28 being forced downwardly and out of both the inlet 27 and the outlet 25, with the increase in pressure forcing the fluid to enter into the expansion tank 36. Accordingly the non return valve 23 is not required to permit liquid to evacuate from the panels 28, when the heat transfer fluid is vaporised therein. Notwithstanding, the non return valve 23 is useful to prevent thermosyphoning during the evening or under cold conditions which would draw heat out of the water in the tank.

Figure 7:
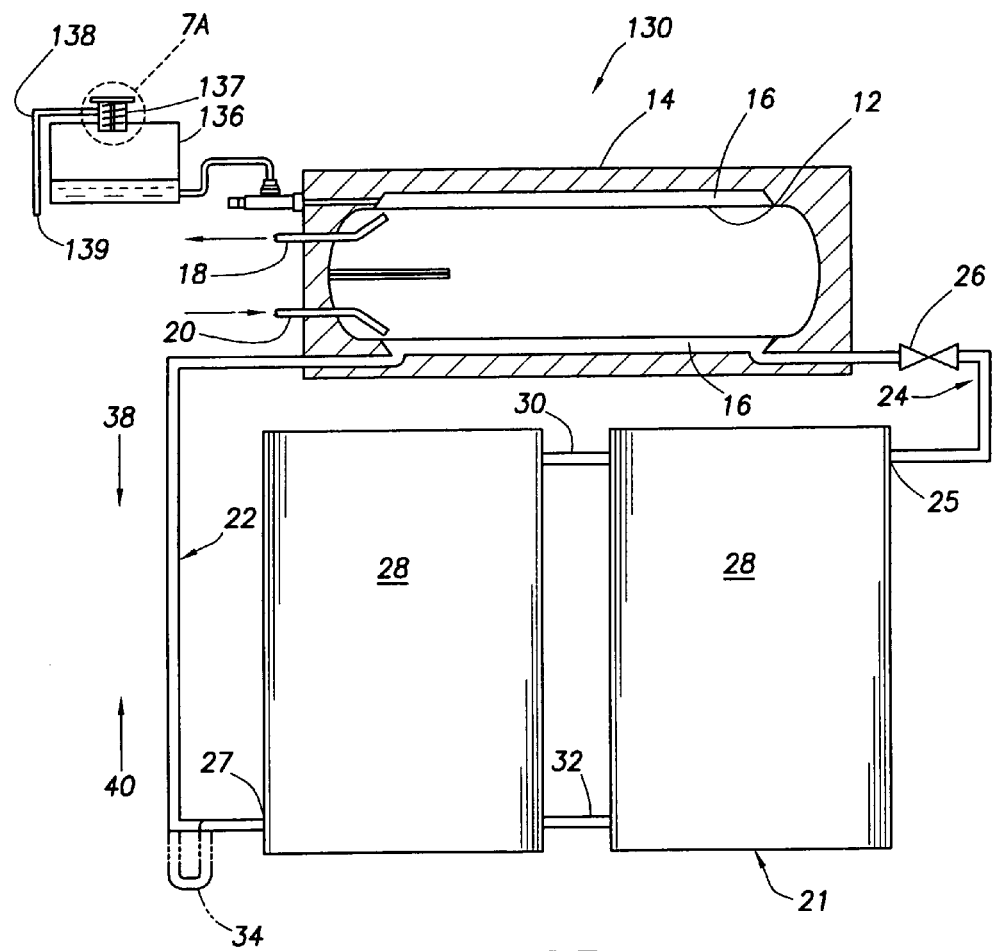
FIG. 7 illustrates a schematic of a solar water heating system similar to that of FIG. 1, with an expansion tank being a reservoir.

Illustrated in FIG. 7 is a solar heating system 130, which is similar to the system 10 of FIG. 1, and like parts have been like numbered. The difference between the system 130 and the system 10, is that the expansion tank 136 is a reservoir which has a pressure relief valve 137 thereon, sealing the volume of the reservoir 136 from atmosphere. In operation the system 130 will be similar to that of the system 10, except that the expansion tank 136 is expected to be less expensive to manufacture. Once pressure in the heat transfer fluid circuit rises due to vaporisation of heat transfer fluid in the solar panels, liquid heat transfer fluid will enter the reservoir 136 and will pressurise any air or gas in the container 136. Once the pressure in said reservoir reaches the operating pressure of the pressure relief valve 137, the pressure relief valve 137 will open allowing pressure to be relieved and any pressured air to flow out of the reservoir 136. The volume of the reservoir 136 is selected to receive all liquid heat transfer fluid which may be evacuated from the solar collection panels 28. In this way, no liquid heat transfer fluid will pass out of the reservoir 136.

Figure 9:
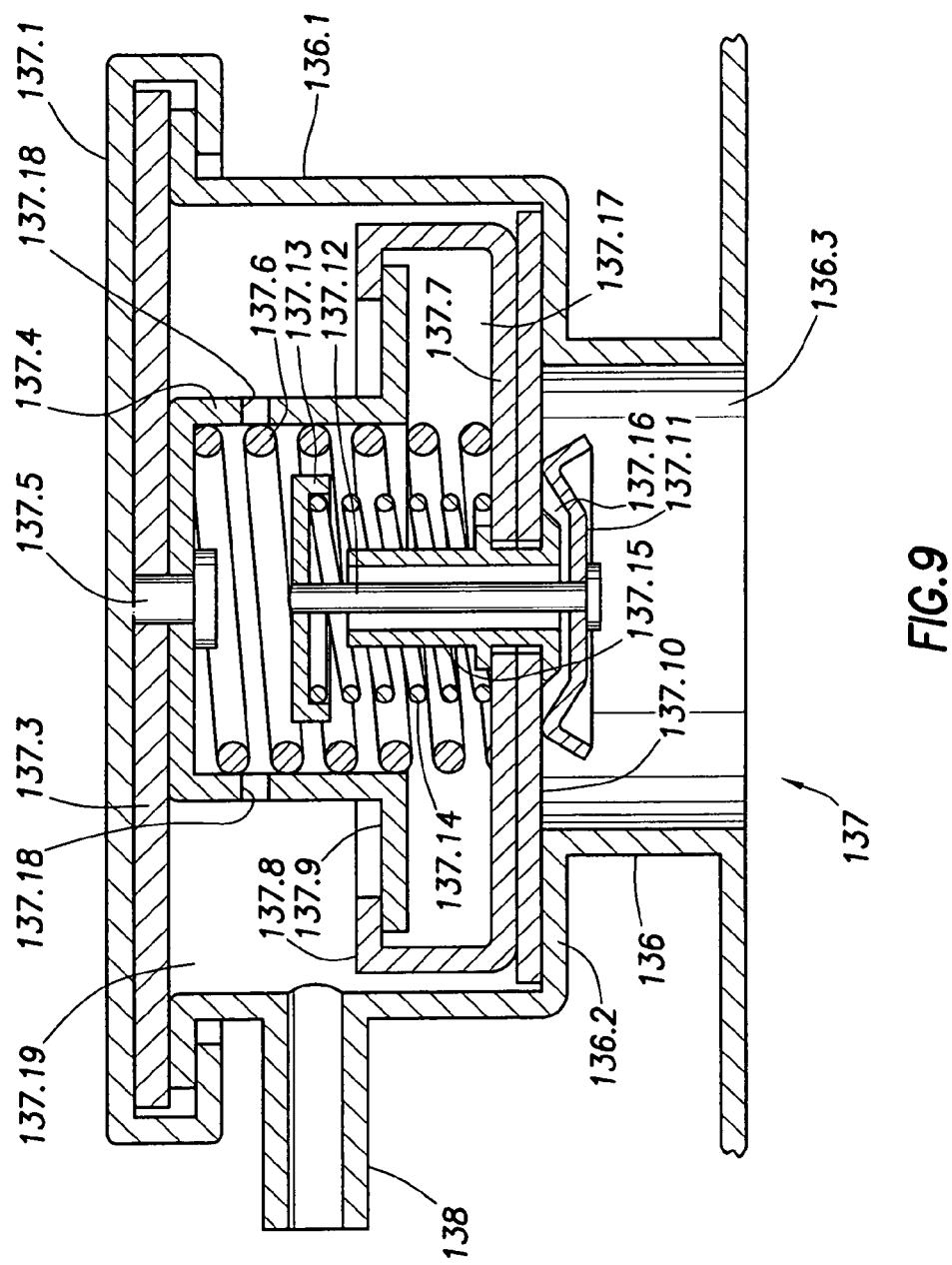
FIG. 9 illustrates a cross section through a pressure relief valve.

The pressure relief valve 137 is preferably of the type which has a one way valve, such as that illustrated in FIG. 9, to allow re-entry of atmosphere as the liquid heat transfer fluid passes back into the heat transfer fluid circuit of system 130.

Figure 8:
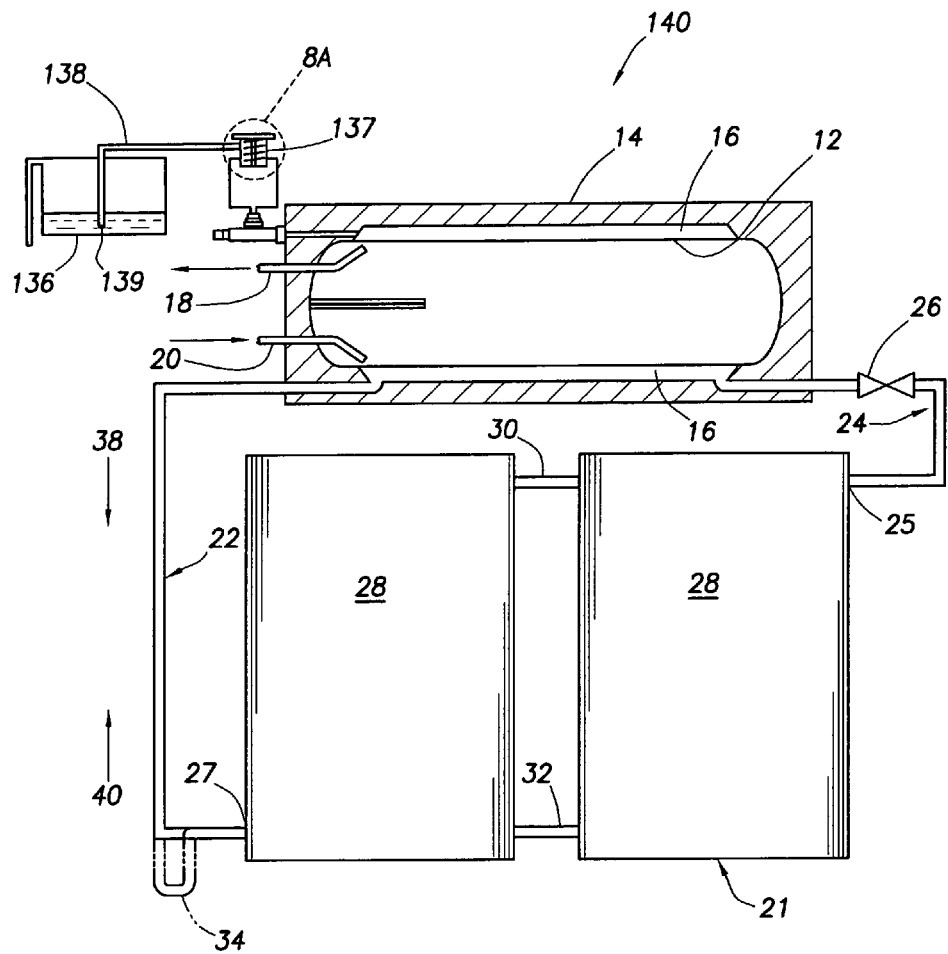
FIG. 8 illustrates a schematic of a solar water heating system similar to that of FIG. 7, wherein a pressure relief valve exists between the reservoir and the heat transfer fluid circuit.

Illustrated in FIG. 8 is solar water heating system 140 which is similar to the system 130 of FIG. 7, and like parts have been like numbered. The differences between the system 130 and the system 140 include that the reservoir 136 is open to atmosphere and that the pressure relief valve 137 prevents egress of liquid heat transfer fluid from the heat transfer fluid circuit until such time as the pressure in the heat transfer fluid circuit rises to or above the pressure at which the pressure relief valve 137 operates. Once this happens the liquid heat transfer fluid will flow into the reservoir 136. The passage closed by the pressure relief valve 137 communicates with the reservoir 136 by conduit 138, which terminates at 139 near to the bottom of the reservoir 136. In priming the reservoir 136, liquid heat transfer fluid can be provided in the reservoir 136 to a level which is above the terminus 139, so that as the pressure in the heat transfer fluid circuit decreases, the liquid heat transfer fluid in the reservoir 136 will flow back into the heat transfer fluid circuit. This will happen due to the pressure relief valve 137, as illustrated in detail in FIG. 9 which includes a one way valving system so that when pressure in the heat transfer fluid circuit decreases below atmosphere it will draw liquid heat transfer fluid from reservoir 136 back into the circuit.

Figure 7A:
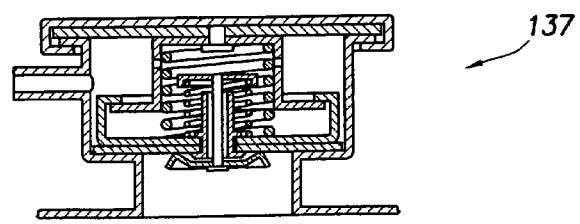
FIG. 7A, illustrates a detail sectional view of the pressure relief valve of FIG. 7.
Figure 8A:
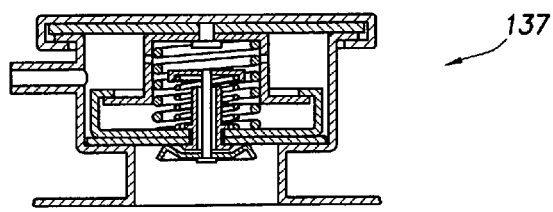
FIG. 8A, illustrates a detail sectional view of the pressure relief valve of FIG. 8.

The pressure relief valve 137 is illustrated in more detail in FIGS. 7A, 8A and 9. The pressure relief valve 137 is mounted onto a cap 137.1 which seals the filler entry 136.1 at the top of the reservoir 136.

The cap 137.1 has a gasket 137.3 adjacent its under surface so as to be sandwiched between cap 137.1 and filler entry 137.2 to provide a seal. The gasket 137.3 is held in place by an annular pressure relief mounting spigot 137.4 which is riveted to the cap 137.1 by a rivet 137.5. The annular spigot 137.4 provides a guide and a housing for a compression spring 137.6 which maintains a valve member 137.7 biased away from the spigot 137.4. The valve member 137.7 is limited in its movement away from the spigot 137.4 by an annular flange 137.8 which engages a flange 137.9 on spigot 137.4.

A gasket 137.10 is provided between the valve member 137.7 and a lower rim 136.2 of the filler entry 136.1.

The gasket 137.10 provides on its undersurface a sealing surface for a one way valve member 137.11 which is secured by a pin 137.12 to a spring holder 137.13. The spring holder 137.13 is biased upwardly/away from the valve member 137.7 by a spring 137.14.

A ferrule or hollow rivet 137.15 passes through the gasket 137.10 and valve member 137.7 and secures them together. The bore through the rivet 137.15 provides a fluid passage connecting the space 137.16 which is between valve member 137.11 and gasket 137.10 and the space 137.17 which is between the spigot 137.4 and the valve member 137.7

A fluid passage exists between the space 137.17 and space 137.19 in the form of apertures 137.18 through the spigot 137.4.

Thus, once sufficient pressure differential exists between the space 136.3 of the volume of the reservoir 136 and space 137.19, such that pressure in space 137.19 is higher than the space 136.3, any air in space 137.19 will force valve member 137.11 to move away from gasket 137.10 against the bias of spring 137.14, allowing air to enter the reservoir space 136.3

Further, as pressure in space 136.3 increases above that of space 137.19, the valve member 137.11 will remain sealed to the gasket 137.10. However, once pressure in space 136.3 produces a force on the gasket 137.10 and valve member 137.11 to overcome the spring force of spring 137.6, the gasket 137.10 and valve member 137.7 and valve member 137.11 will all move away from the rim 136.2 allowing air under pressure in space 136.3 to exit via rim 136.2, until such time as pressure is reduced in space 136.3, allowing spring 137.6 to move member 137.7 and gasket 137.10 to close the rim 136.2.

The valve 137 of FIG. 9 has been described with respect to the embodiment of FIG. 7, where only air will pass through the valve 137. It will be readily understood, that the valve 137 will work in exactly the same manner in the embodiment of FIG. 8, except that instead of air passing through valve 137, liquid heat transfer fluid will pass through. In the embodiment of FIG. 8 the components of FIG. 9 identified by base numeral 136, will all be formed as part of or attached to the heat transfer fluid circuit, not the reservoir as is the case of the FIG. 7 embodiment.

Figure 10:
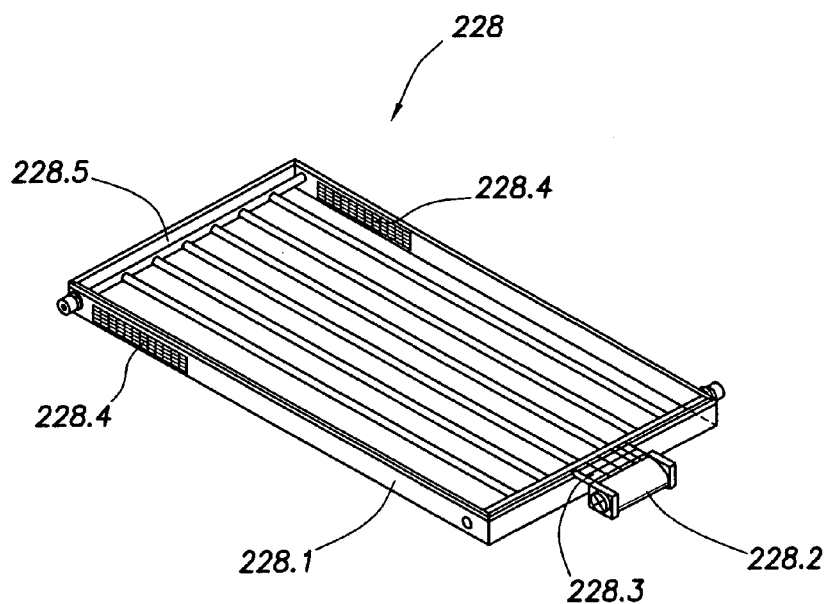
FIG. 10 illustrates a perspective view of a solar collection panel having an over-temperature relief system.

Illustrated in FIG. 10 is a solar collection panel 228 which has in its casing 228.1 a fan unit 228.2 powered by a photovoltaic cell 228.3 or other electricity source. The fan 228.2 is powered when the control circuit detects a predetermined temperature of either the heat transfer fluid or the water being heated thereby. The other end of the casing 228.1 of the solar collection panel 228 has openings 228.4 which are overlaid or constructed from mesh to keep out insects. If required, a shroud can be placed over the openings to help protect from rain, and other falling moisture.

The switching on and switching off of the fan 228.2 is be controlled, as is described later, so as to assist in the flow through of air through the solar collection panel, when it develops an over-temperature condition.

If desired, hatches can be provided to cover or seal the openings 228.4. These can be opened and closed when the fan 228.2 is switched on or off or the hatches can be opened or closed by memory metal motive power units or by bimetallic strips, which react to heat to provide or reduce motive power.

Figure 11:
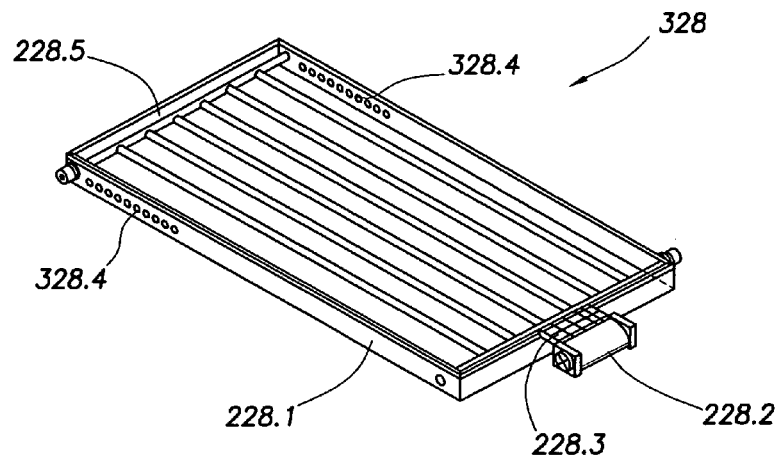
FIG. 11 illustrates a perspective view of a solar collection panel having another over-temperature relief system.

Illustrated in FIG. 11 is a solar collection panel 328 which is similar to panel 228 of FIG. 10, with like parts being like numbered.

The difference between panels 328 and 228 is that the openings 328.4 in panel 328 are simply unshielded 3 mm holes. In the case of openings 328.4 and 228.4, these are preferably not positioned in the top end 228.5, as this end is more exposed to rain and precipitation. However, the openings 328.4 and 228.4 can be placed in end 228.5 if a shroud is utilised to protect against rainfall entering the casing 228.1.

Figure 12:
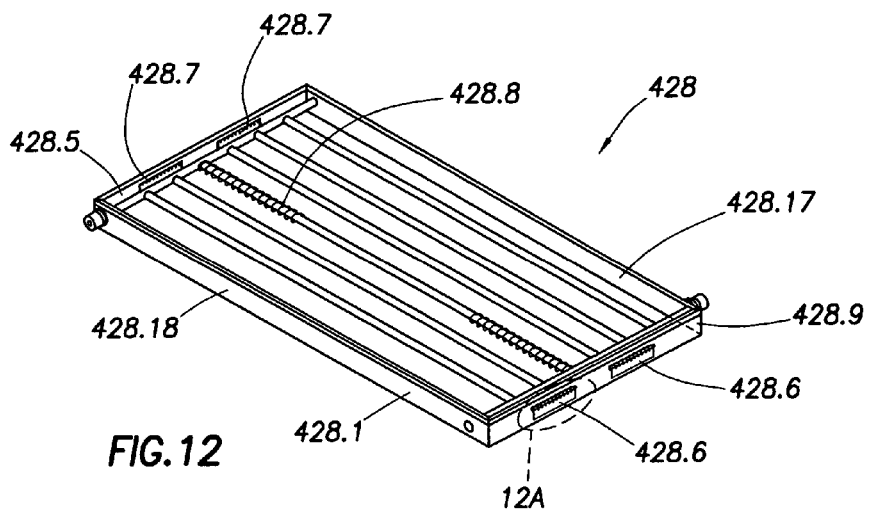
FIG. 12 illustrates a perspective view of a solar collection panel embodying another over temperature relief system.
Figure 12A:
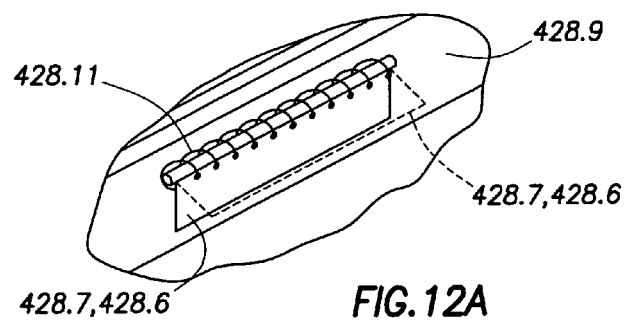
FIG. 12A illustrates a detailed perspective view of a portion of FIG. 12.

Illustrated in FIGS. 12 and 12A is a solar collection panel 428 which has on upper and lower sides 428.5 and 428.9 of casing 428.1, openings which are sealed with hatches 428.6 and 428.7. The hatches 428.6 and 428.7 seal the openings when in the closed condition. They allow free access of convection currents to travel from the lower side 428.9 to upper side 428.5 when the hatches 428.6 and 428.7 are in the open condition. The hatches 428.6 and 428.7 are kept in the closed condition by means of linkages and a memory metal spring 428.8. The memory metal spring will lose its elasticity as the memory metal heats above a predetermined temperature being its phase transition temperature. As spring 428.8 maintains hatches 428.7 and 428.6 closed by simple linkages overcoming the bias of torsion springs 428.11, the torsion spring 428.11 will open the hatches 428.7 and 428.6 allowing ingress and egress of convection air flow. When the temperature falls to a predetermined amount, memory metal spring 428.8 will regain its elasticity causing the hatches to close under the bias of torsion springs 428.11.

The mechanism to open and close the hatches 428.6 and 428.7 can be replaced by motors and linkages, or bimetallic motive power units.

Figure 13:
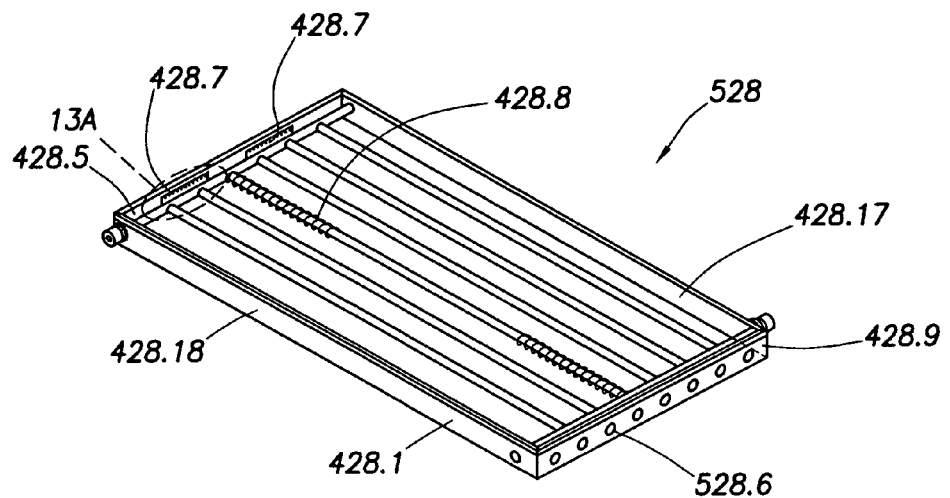
FIG. 13 illustrates a perspective view of a solar collection panel embodying another over temperature relief system.
Figure 13A:
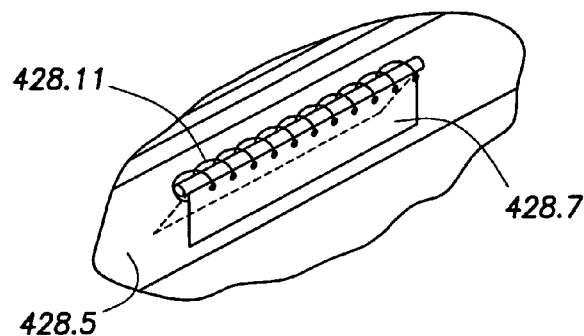
FIG. 13A illustrates a detailed perspective view of a portion of FIG. 13.

Illustrated in FIGS. 13 and 13A is a solar panel 528 similar to panel 428 of FIGS. 12 and 12A. The panel 528 differs from panel 428 in that hatches 428.6 and corresponding square openings have been replaced by a series of 3 mm diameter holes 528.6. This embodiment will function in the same manner as the panel 428, in that as holes 528.6 are in the lower side 428.9 they will be protected from the entry of rain, and as the hatches 428.7 will not normally be open, a convection current or air flow will not pass through openings 528.6 and into the casing 428.1.

Once the predetermined temperature is reached, say 120° C., the spring 428.8 loses it elasticity due to it being made of a memory metal, the tension springs 428.11 will open hatches 428.7, thus allowing convection currents to flow through, from bottom to top.

Figure 14:
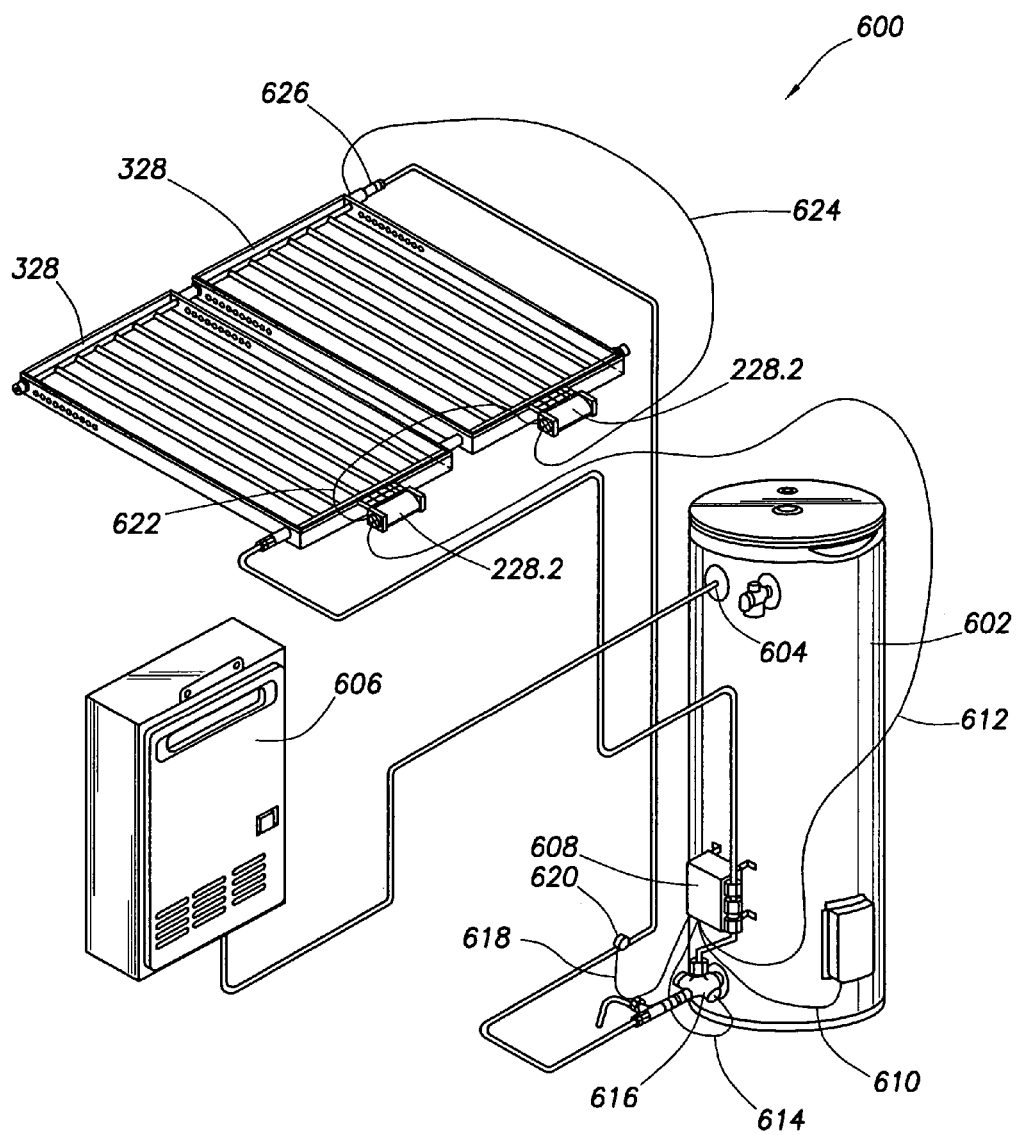
FIG. 14 illustrates a water heating system which utilises the solar collection panel of FIG. 11.

Illustrated in FIG. 14 is a solar heated storage with instantaneous booster water heater system 600, which does not have a separate heat transfer fluid circuit. Instead, the water in the tank is heated directly in the panels 328. The system 600 includes two parallel connected solar panels 328 as illustrated and described with respect to FIG. 11.

The system 600 also includes a storage tank 602. The outer jacket around the storage tank 602 is visible, but the internal heat exchanger is not. A controller and pump is also provided at 608 to circulate cold water from tank 602 up to the panels 328, and back.

The output 604 from tank 602 passes to an instantaneous booster heater 606 in case water in tank 602 has not achieved the desired working temperature.

As can be seen from FIG. 14 the control box 608 has: a lead 610 to/from the tank thermistor; lead 612 to/from fan 228.2 on left side panel 328, lead 614 to heat transfer fluid inlet valve 616; lead 618 from line thermistor 620; while lead 622 connects fan 228.2 on left side panel 328 to/from fan 228.2 on right side panel 328; while lead 624 connects right side fan 228.2 to thermistor 626 on the on the outlet from right side panel 328.

In operation, if thermistor 626 is activated due to a predetermined temperature being sensed, both fans 228.2 will be switched on.

Further, if tank thermistor reaches its predetermined temperature, the control box 608 will also send a signal to activate fans 228.2. Likewise for thermistor 620, or valve 616.

Once the temperature at the activation site decreases, the fan 228.2 will be shut down. While multiple sensors could cause the fans 228.2 to activate, if desired, any one, or combination of two or more of these sensors can be utilised.

Figure 15:
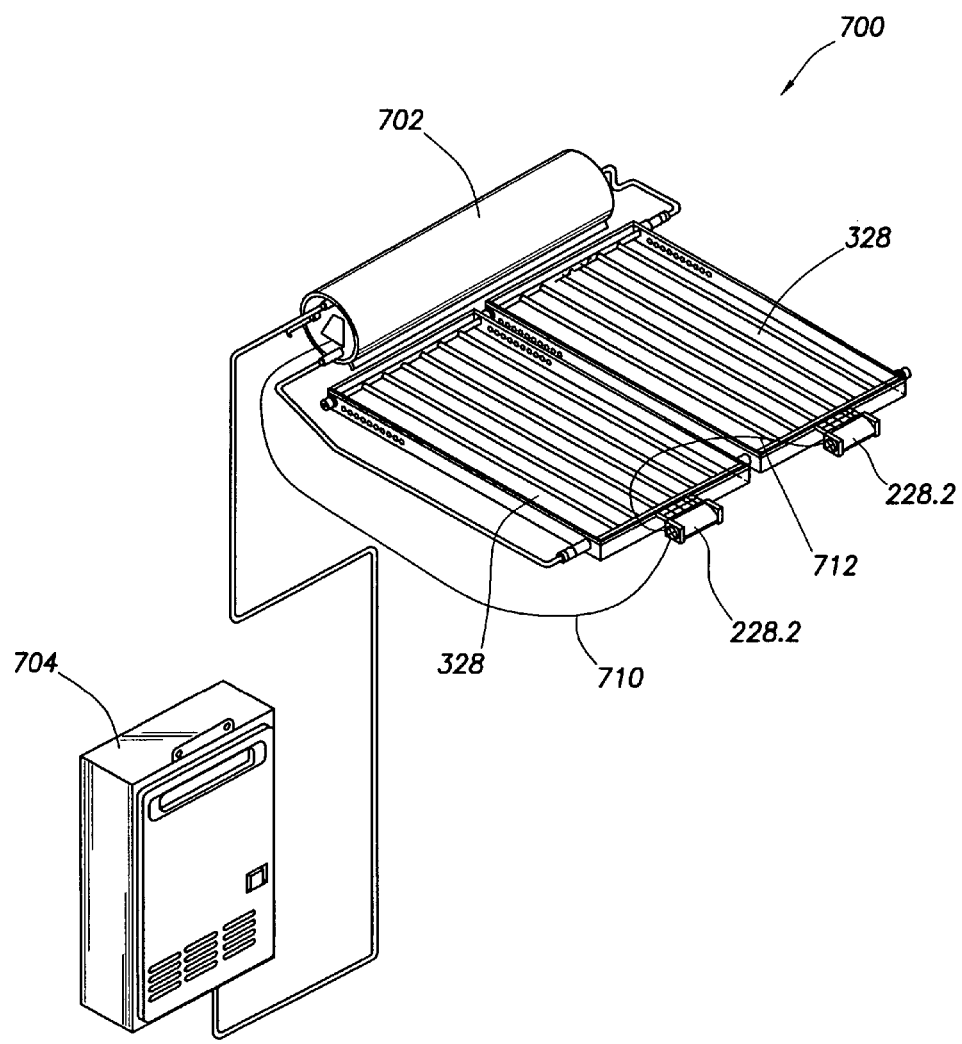
FIG. 15 illustrates a thermosyphoning solar water heating system and associated instantaneous water heater which utilises the solar collection panel of FIG. 11.

Illustrated in FIG. 15 is a thermosyphoning solar storage with instantaneous back up water heating system 700. It comprises two panels 328, a storage tank 702 and an instantaneous heating device 704 through which water from tank 702 passes A lead 710 connects to/from fans 228.2 on left side panel 328, while a lead 712 connects left side fan 228.2 to right side fan 228.2.

The lead 710 will carry a signal from one or more thermistors which sense the temperature of: the water being heated; the heat transfer fluid temperature leaving the panels 328; the heat transfer fluid temperature entering the heat transfer fluid/water heat exchanger, or other appropriate location, or from the solar control system.

Photovoltaic cells are preferred to power fans 228.2, rather than utilising mains powers, due to overheating generally being caused when mains power has shut down.

Figure 17:
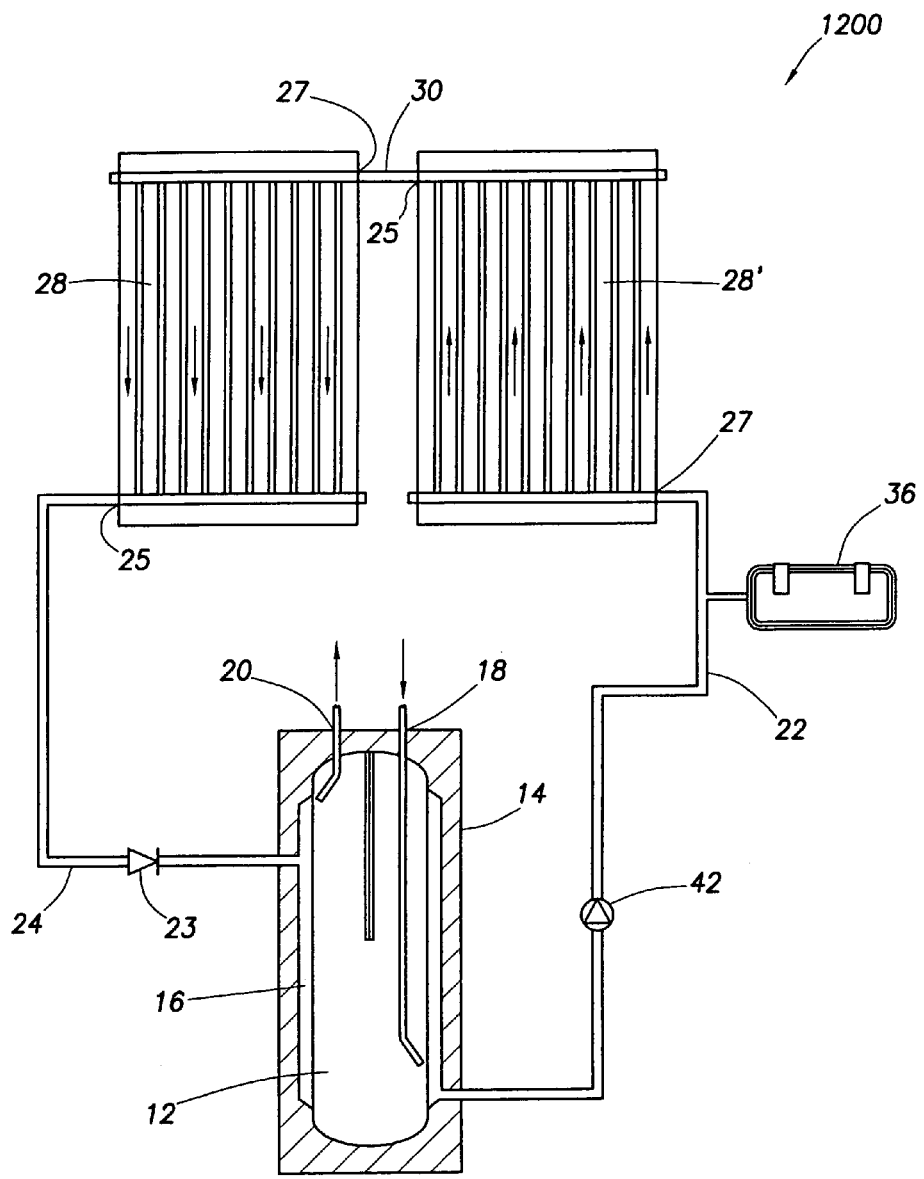
FIG. 17 illustrates a series connected two collector panel solar heating system similar to that of FIG. 6, with the collection flow tubes in a vertical orientation.

Illustrated in FIG. 17 is a solar water heating system 1200, which is similar to the system 200 of FIG. 16, with like parts being like numbered. The system 1200 differs from the system 200 in that the panel 28' has the heat transfer fluid flowing in the upward direction only in its collection flow tubes, while the panel 28 has the heat transfer fluid flowing in the downward direction. The inlet 27 of the panel 28' is in the lower right hand corner, with its outlet 25 being in the upper left hand corner, while the panel 28 has its inlet in the upper left hand corner with the outlet in the lower right hand corner.

Another difference is that the one way valve 23 is located in the inlet connection 24 while the expansion vessel 36 is located in the outlet connection 22.

In operation in an over temperature condition, the heat transfer fluid will pass out of the panel 28' under pressure, and will not flow back in outlet connection 22 due to the one way valve 23. and thus into the expansion tank 36, as explained above. The liquid in the panel 28 which is expelled via outlet 25 will flow, into the outlet connection 22, if the pressure in the inlet connection 24 is greater than the outlet connection 22. Vaporised heat transfer fluid will occupy the upper segments of the panels 28 and 28' until sufficient cooling thereof occurs.

Figure 18:
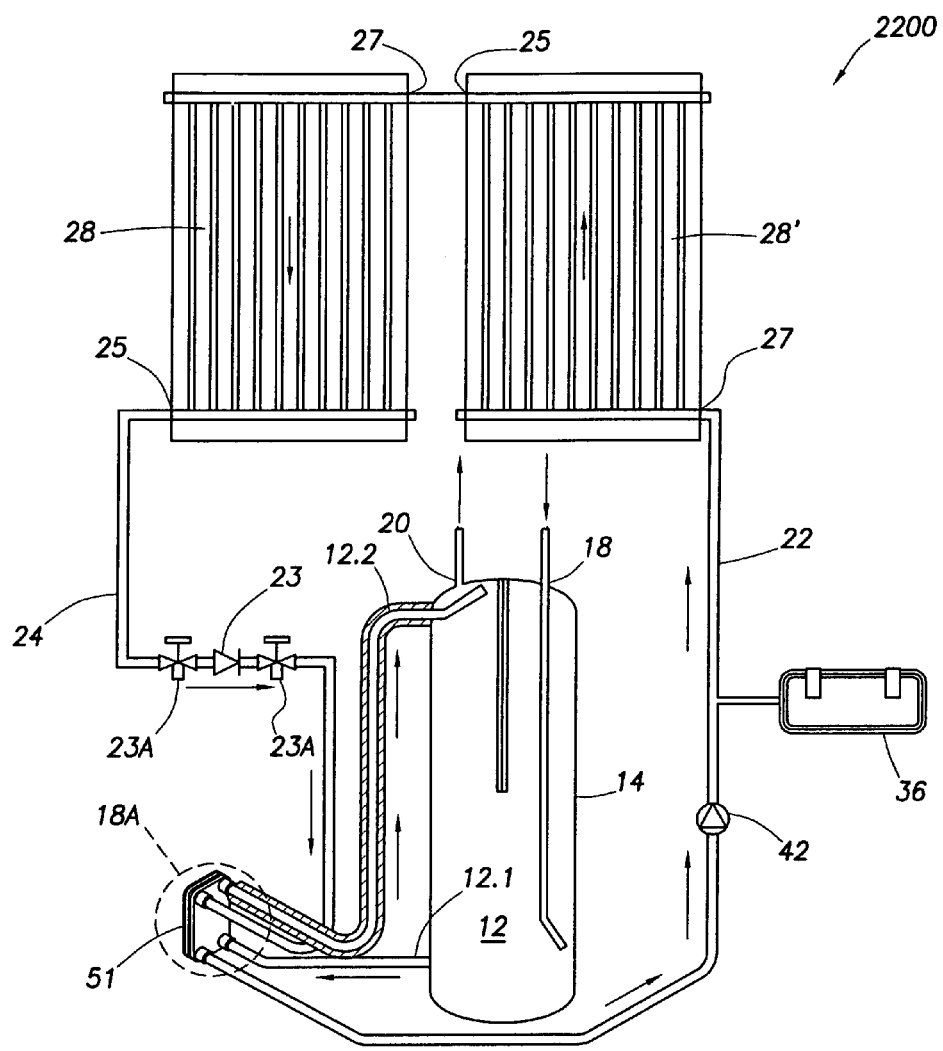
FIG. 18 illustrates a two collector panel solar heating system, with collection flow tubes in a vertical orientation, where the panels are connected in series connections, with the jacket heat exchanger has been replaced by a BPHE (brazed plate heat exchanger)

Illustrated in FIG. 18 is a system 2200, which is similar to the system 1200 and like parts have been like numbered. The difference between the systems 2200 and 1200, is that instead of a jacket heat exchanger 16, the system 2200 has a heat exchanger 51, being a brazed plate heat exchanger which has one path for the pumped heat exchanger fluid, and counter flow path for the water from the tank 12 to be heated. The tank 12 is preferably of the order of 270 to 400 litres in volume with a standing height 1.6 m but of the order of 1 m to 1.8 m will suffice.

Figure 18A:
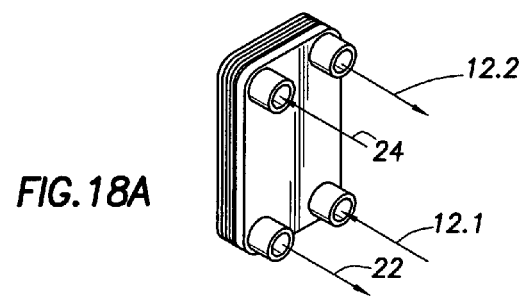
FIG. 18A, illustrates a detail perspective view of the heat exchanger of FIG. 18.

The brazed plate heat exchanger 51 has a single pass on each of the heat transfer fluid and water to be heated circuits. These two circuits operate in a counter flow arrangement so as to maximise the heat transfer capability. The heat exchanger 51 also provides between 0.3 square meters to 0.5 square meters of heat exchange surface area which is achieved by means of between 15 and 25 plates in the brazed plate heat exchanger assembly. The water from the tank 12, through conduit 12.1, FIGS. 18 and 18A, will flow through the heat exchanger 51 by means of thermo-syphoning. In order to assist this thermo-syphoning effect the heat exchanger 51 is of the order of 250 to 300 millimeters in height, with the hot water outlet from the heat exchanger 51, being between 500 mm and 1000 mm, and most preferably at around 700 mm below the outlet of an insulated conduit delivering the heated water back to the tank 12. If required the brazed plate heat exchanger can be a double walled unit so as to ensure that any leak from the heat transfer fluid circuit will not mix with the potable water. However, it is expected that at the relatively low pressures of operation of the heat transfer circuit such a double wall system will not be required.

Further on either side of the one way valve 23 are manual valves 23A. By opening the valve 23A on the right, which acts as an inlet to the heat transfer circuit, the heat transfer circuit can be filled, as the fluid will not flow in an anti-clockwise direction due to the presence of one way valve 23. However, the valve 23A on the left will also have to be opened to allow air and heat transfer fluid to flow out of the circuit 21.

Figure 19:
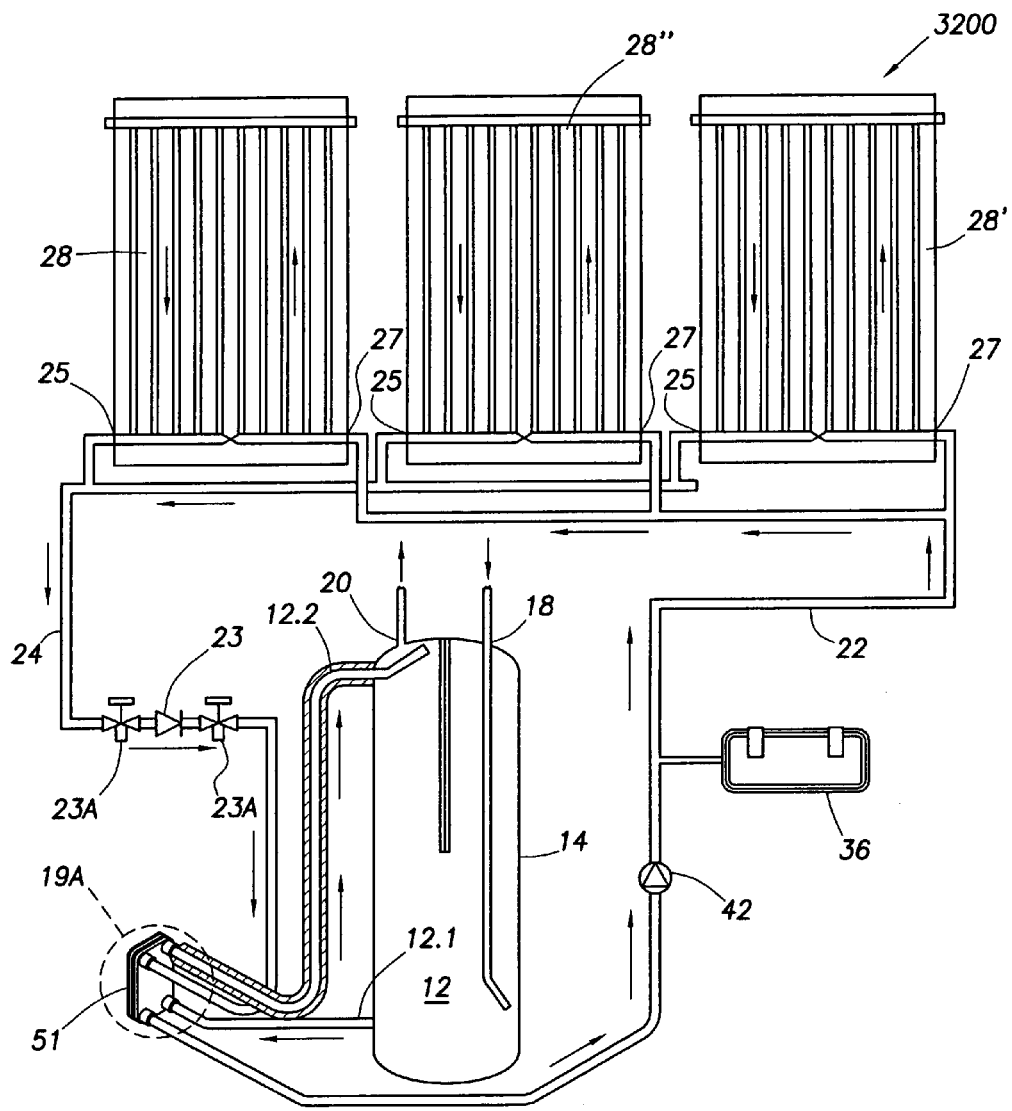
FIG. 19 illustrates a three collector panel solar heating system, with collection flow tubes in a vertical orientation, where the panels are connected with parallel connections, with a BPHE (brazed plate heat exchanger)
Figure 19A:
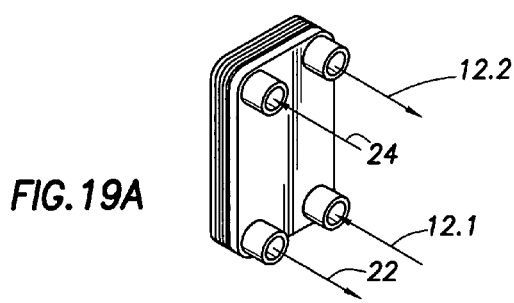
FIG. 19A, illustrates a detail perspective view of the brazed plate heat exchanger of FIG. 19.

Illustrated in FIG. 19 is a system 3200, which is similar to the system 2200 of FIG. 18, and like parts have been like numbered. The system 3200 differs from the system 2200 in that the panels 28, 28' and 28" have their lower cross tubes crimped, forcing in each panel the flow of heat transfer fluid in up in the right hand side of each panel and down on the left hand side. The outlets 25 are all connected in parallel to the inlet connection 24, and all the inlets 27 are connected on parallel to the outlet connection 22.

While the above description and referred to figures show collection tubes with a single orientation, the solar collectors can employ panels which have the collection tubes oriented in a combination of one or more of: vertically oriented, horizontally oriented, or oriented at an angle to either.

It will be understood that the invention disclosed and defined herein extends to all alternative combinations of two or more of the individual features mentioned or evident from the text. All of these different combinations constitute various alternative aspects of the invention.

The foregoing describes embodiments of the present invention and modifications, obvious to those skilled in the art can be made thereto, without departing from the scope of the present invention.

The invention claimed is:

1. A solar water heating system including:
   a water tank to hold water to be heated,
   a heat transfer fluid circuit including an heat exchanger associated with said water tank to heat water therein,
   a solar collection means in communication with said heat exchanger,
   an inlet connection to carry heat transfer fluid by thermo-syphoning from said solar collection means to said heat exchanger where said water will be heated; and
   an outlet connection to carry heat transfer fluid from said heat exchanger to said solar collection means where said heat transfer fluid will be heated,
   said heat transfer fluid circuit including a reversibly evaporable heat transfer fluid (HTF), in a liquid state, which will absorb heat from said solar collection means and which will transfer said heat to said water in said water tank by means of said heat exchanger;
   an isolation valve operated to close to interrupt said thermosyphoning to cause said liquid heat transfer fluid in said solar collection means to become stagnant and open to allow said thermosyphoning to continue or resume in response to a temperature or pressure sensor; and a liquid diversion path including a receptacle arranged to receive liquid phase heat transfer fluid (HTF) from the heat transfer fluid circuit when stagnant heat transfer fluid in the said solar collection means vaporizes;

whereby when a predetermined temperature of the heat transfer fluid is reached or exceeded, said isolation valve closes and flow of said heat transfer fluid, in a liquid state, becomes stagnant, a portion of heat transfer fluid changes to a gaseous state in said solar collection means and is retained in said solar collection means by said isolation valve, and heat transfer fluid in a liquid state will be forced out of said solar collection means into said liquid diversion path.

2. A solar water heating system as claimed in claim 1, wherein the diversion path is a pressure controlled diversion circuit.

3. A solar water heating system as claimed in claim 1, wherein the receptacle is one of a vessel, an expansion vessel, or a reservoir.

4. A solar water heating system as claimed in claim 1, wherein the diversion path includes a pressure controlled valve adapted to admit heat transfer fluid to the receptacle when the pressure in the heat transfer fluid circuit exceeds a first pressure threshold.

5. A solar water heating system as claimed in claim 1, wherein the diversion path is adapted to deliver heat transfer fluid to the heat transfer circuit when the pressure in the heat transfer fluid circuit falls below the pressure in the diversion path.

6. A solar water heating system as claimed in claim 1, wherein said inlet connection exits said solar collection means at a first location which is above a second location where said outlet connection enters said solar collection means, said system being characterised by including a flow stop means to stop the flow of said heat transfer fluid in response to a signal indicative of the heat transfer fluid circuit having attained a predetermined over-temperature condition.

7. A solar water heating system as claimed in claim 6, wherein said inlet connection includes a valve means which can be closed.

8. A solar water heating system as claimed in claim 1, wherein said heat transfer fluid in a liquid state is forced out of said solar collection means under pressure passes via an inlet of said solar collection means and then into said diversion path.

9. A solar water heating system as claimed in claim 1, wherein direction of flow of said heat transfer fluid leaving said solar collection means to enter said diversion path is in the opposite direction as for the normal heating operation of said system.

10. A solar heating system as claimed in claim 1, wherein a valve means is used to prevent gaseous heat transfer fluid being pushed out of said solar collection means.

11. A solar water heating system as claimed in claim 1, wherein said heat exchanger is a jacket located around said water tank.

12. A solar water heating system as claimed in claim 1, wherein said water tank includes said diversion path, or said diversion path is attached thereto or included therein.

13. A solar water heating system as claimed in claim 1, wherein the heat exchanger associated with said water tank to heat water therein, is a brazed plate heat exchanger.

14. A solar water heating system as claimed in claim 1, wherein said solar collection means or said outlet connection includes, between said diversion path and said solar collection means, a liquid trap, to prevent gas passing therethrough.

15. A solar water heating system as claimed in claim 1, wherein the volume able to be received by said diversion path is in the range of the volume of heat transfer fluid in said solar collection means up to the total volume of heat transfer fluid in the system.

16. A solar water heating system as claimed in claim 1, wherein volume able to be received by said diversion path is in the range of the volume of heat transfer fluid in said solar collection means plus said inlet and said outlet connections up to the total volume of heat transfer fluid in said system.

17. A solar water heating system as claimed in claim 1, wherein said solar collection means has collection flow tubes oriented in a substantially horizontal orientation.

18. A solar water heating system as claimed in claim 1, wherein said solar collection means has collection flow tubes oriented in a substantially vertical orientation.

19. A solar water heating system as claimed in claim 1, wherein said solar collection means has collection flow tubes oriented at an angle to the vertical or horizontal.

20. A solar water heating system as claimed in claim 1, wherein said solar collection means is a flat plate collector.

21. A solar water heating system as claimed in claim 1, wherein said solar collection means includes two or more solar collection panels being connected in series with said inlet connection and said outlet connection.

22. A solar water heating system as claimed in claim 1, wherein said solar collection means includes two or more solar collection panels being connected in parallel with said inlet connection and said outlet connection.

23. A solar water heating system as claimed in claim 1, wherein said heat transfer fluid includes a 1,2-propylene glycol, water and inhibitors.

24. A solar water heating system as claimed in claim 6, wherein said flow stop means and a valve included in said heat transfer circuit so that thermosyphoning in cool ambient conditions will not occur, are combined in a single isolation valve.

25. A solar heating system as claimed in claim 1, wherein said diversion path is branched off said inlet connection.

26. A solar water heating system as claimed in claim 4, wherein said pressure controlled valve is forced to operate by said heat transfer fluid acting indirectly thereon, such as by means of air being pressurised by said heat transfer fluid.

27. A solar water heating system as claimed in claim 26, wherein said diversion path communicates with the heat transfer fluid circuit, whereby once pressure in said circuit reduces, any liquid heat transfer fluid which passed into said receptacle can pass back into said heat transfer fluid circuit.

28. A solar water heating system as claimed in claim 1, wherein a pressure controlled valve is present between said heat transfer fluid circuit and said diversion path, whereby heat transfer fluid passing to said diversion path does so via said pressure controlled valve into said diversion path.

29. A solar water heating system as claimed in claim 1, wherein said diversion path is vented to atmosphere.

30. A solar water heating system as claimed in claim 27, wherein heat transfer fluid passing said pressure controlled valve exits a conduit from said pressure controlled valve which terminates near to the bottom of said receptacle.

31. A solar water heating system as claimed in claim 27, wherein said receptacle includes an amount of liquid heat transfer fluid in the bottom thereof to a level which will cover the termination of said conduit.

32. A solar water heating system as claimed in claim 27, wherein said pressure controlled valve is of the type which has a one way valve to allow fluid passing into said liquid diversion path to re-enter said circuit.

33. A method of protecting a solar water heating system employing a heat transfer fluid flowing from a solar collector to a heat exchanger by thermosyphoning, said method including the steps of:
  stopping flow of a liquid phase heat transfer fluid from said solar collector to said heat exchanger due to thermosyphoning in response to temperature reaching or exceeding a predetermined temperature of the heat transfer fluid in said system, whereby said flow of liquid phase heat transfer fluid becomes stagnant,
  allowing some of the heat transfer fluid in said system to boil in said solar collector in said system, whereby, once boiled, the heat transfer fluid in the gaseous state will force liquid heat transfer fluid from said solar collector, and accommodating the expanded volume of heat transfer fluid in a liquid diversion path.

34. A method as claimed in claim 33, wherein a valve means is used to prevent gaseous heat transfer fluid moving out of said solar collector via the outlet of said solar collector, said outlet being that opening from which heated heat transfer fluid would normally exit said collector in a liquid phase to travel to said heat exchanger to heat water in a tank of said system.

35. A method as claimed in claim 34, wherein said diversion path is located between an outlet of the heat exchanger of said system and the inlet to the solar collector, said inlet being that opening from which cooled heat transfer fluid would normally enter said solar collector after heating water in said tank via said heat exchanger.

* * * * *